(12) United States Patent
Munnangi et al.

(10) Patent No.: US 9,231,246 B2
(45) Date of Patent: Jan. 5, 2016

(54) CARBON-FEF2 AND CARBON-FE2O3 NANOCOMPOSITES, THEIR PREPARATION AND USE AS ELECTROCHEMICAL STORAGE MATERIAL

(71) Applicant: KARLSRUHER INSTITUT FUER TECHNOLOGIE, Karlsruhe (DE)

(72) Inventors: Anji Reddy Munnangi, Eggenstein-Leopoldshafen (DE); Ben Breitung, Karlsruhe (DE); Maximilian Fichtner, Oftersheim (DE); Horst Hahn, Seeheim-Jugenheim (DE)

(73) Assignee: KARLSRUHE INSTITUT FUER TECHNOLOGIE, Karlsruhe (DE)

( * ) Notice: Subject to any disclaimer, the term of this patent is extended or adjusted under 35 U.S.C. 154(b) by 0 days.

(21) Appl. No.: 13/933,685

(22) Filed: Jul. 2, 2013

(65) Prior Publication Data
US 2014/0001412 A1    Jan. 2, 2014

(30) Foreign Application Priority Data

Jul. 2, 2012    (EP) ................... 12401133

(51) Int. Cl.
*H01B 1/08*    (2006.01)
*H01M 4/36*    (2006.01)
(Continued)

(52) U.S. Cl.
CPC ............. *H01M 4/364* (2013.01); *B82Y 30/00* (2013.01); *C01G 49/00* (2013.01); *C01G 49/10* (2013.01); *H01M 4/523* (2013.01); *H01M 4/582* (2013.01); *H01M 4/587* (2013.01); *C01P 2002/72* (2013.01); *C01P 2002/82* (2013.01); *C01P 2004/04* (2013.01); *C01P 2004/64* (2013.01); *C01P 2006/12* (2013.01);
(Continued)

(58) Field of Classification Search
CPC ........ C07C 17/10; C07C 19/10; C07C 17/25; C07C 17/206; C07C 21/18; H01B 1/08
USPC ........................................................ 252/506
See application file for complete search history.

(56) References Cited

U.S. PATENT DOCUMENTS 2,683,123 A * 7/1954 Schwegler et al. ........... 502/316
3,703,697 A * 11/1972 Nicholas ....................... 338/35
(Continued)

OTHER PUBLICATIONS

Amatucci et al: "Formation of Lithium Fluoride/Metal Nanocomposites for Energy Storage through Solid State Reduction of Metal Fluorides," Journal of Fluorine Chemistry vol. 132, No. 12. Jun. 24, 2011, pp. 1086-1094.
(Continued)

*Primary Examiner* — Harold Pyon
*Assistant Examiner* — William Young
(74) *Attorney, Agent, or Firm* — Venable LLP; Robert Kinberg (57) ABSTRACT

A method is provided to synthesize nanocomposites containing intercalated $FeF_2$— or $Fe_2O_3$— nanoparticles in a graphitic carbon matrix by reaction of a volatile iron compound with a graphite fluoride $(CF_x)$ or a graphite oxide $(CO_x)$. Additionally provided is a nanocomposite material containing intercalated $FeF_2$— or $Fe_2O_3$— nanoparticles in a graphitic carbon matrix and its use as an electrochemically active material in particular for use in electrochemical storage cells.

4 Claims, 7 Drawing Sheets

(51) Int. Cl.

| | |
|---|---|
| *C01G 49/00* | (2006.01) |
| *C01G 49/10* | (2006.01) |
| *H01M 4/52* | (2010.01) |
| *H01M 4/58* | (2010.01) |
| *H01M 4/587* | (2010.01) |
| *B82Y 30/00* | (2011.01) |

(52) U.S. Cl.
CPC ........ *C01P 2006/14* (2013.01); *C01P 2006/40* (2013.01); *H01B 1/08* (2013.01)

(56) References Cited

U.S. PATENT DOCUMENTS

| | | | | |
|---|---|---|---|---|
| 4,980,250 | A | * | 12/1990 | Takahashi et al. ............ 429/306 |
| 5,622,683 | A | * | 4/1997 | Hung ............................ 423/414 |
| 2002/0076837 | A1 | * | 6/2002 | Hujanen et al. .................. 438/3 |
| 2004/0062994 | A1 | | 4/2004 | Amatucci |
| 2012/0104327 | A1 | * | 5/2012 | Kim et al. ..................... 252/507 |

OTHER PUBLICATIONS

Badway et al. "Carbon-Metal Fluoride Nanocomposites. Structure and Electrochemistry of FEF3:C," Journal of the Electrochemical Society, vol. 150, No. 9. Jul. 17, 2003. pp. A1209-1218.
Badway et al. "Carbon Metal Fluoride Nanocomposites. High-Capacity Reversible Metal Fluoride Conversion Materials as Rechargeable Positive Electrodes for Li Batteries," Journal of the Electrochemical Society, vol. 150, No. 10, Aug. 15, 2003. pp. A1318-1327.
Hummers et al. "Preparation of Graphite Oxide." Journal of the American Chemical Society, vol. 180, No. 6. Mar. 20, 1958, p. 1339.
Search Report issued in European Application EP12401133, dated Nov. 8, 2012.

* cited by examiner

2 Theta (°)

CARBON-FEF2 AND CARBON-FE2O3 NANOCOMPOSITES, THEIR PREPARATION AND USE AS ELECTROCHEMICAL STORAGE MATERIAL

BACKGROUND OF THE INVENTION

The present invention provides new nanocomposites comprising a graphitic matrix in which nanosized iron fluoride or iron oxide particles are embedded. The invention further comprises a one-step method for preparing said composites and their use as electrode material.

Lithium ion batteries are key energy storage devices that power today's consumer electronics. However, their energy density still fall short for transportation and large scale power storage applications. One way to increase the energy density of battery is to use high energy density electrode materials. The present commercial Li-ion batteries use $LiCoO_2$ or $LiFePO_4$ based insertion positive electrode materials. While $LiCoO_2$ is a layered compound with a specific capacity of 150 mAh/g, $LiFePO_4$ is a framework compound whose capacity is 170 mAh/g. Even though both compounds show excellent reversibility with lithium, the specific capacity is limited by single electron redox reaction per molecule or even less.

A valid approach to increase the energy density of electrode material is to utilize all possible redox states of metal ion. The best candidates for this purpose are metal fluorides as they reversibly react with lithium at relatively high voltage (H. Li, J. Richter and J. Maier., Adv. Mater. (2003), 15, 736-739). However, to their disadvantage metal fluorides are electrical insulators. Further, when micron sized metal fluoride particles are used the capacity fades rapidly with cycling.

Among various metal fluorides, iron fluorides are important class due to their low cost and low toxicity. In this context, $FeF_2$ is an interesting cathode material which has a thermodynamic reduction potential of 2.66 V versus lithium and has a theoretical specific capacity of 571 mAh/g to a gravimetric energy density of 1519 Wh/kg. However, $FeF_2$ is an electrical insulator and needs to stay in intimate contact with electronic conductors in order to become electrochemically active.

To address these problems carbon-metal fluoride nanocomposites (CMFNCs) are proposed in U.S. 2004/0062994. These composites are prepared using mechanical high-energy milling of $FeF_2$, $FeF_3$, $NH_4FeF_4$, NiF, or CoF and activated carbon, carbon black, or expanded graphite. The total carbon content in the nanocomposites comprises about 5% to 50% by weight. Similar composites and a method for their preparation are described by Badway et al. (F. Badway, N. Pereira, F. Cosandey and G. G. Amatucci J. Electrochem. Soc., (2003), 150 (9), 1209-1218). However, the preparation of graphitic carbon-metal fluoride nanocomposites by simple milling leads to less stable interfaces between carbon and the respective metal compound. Hence, carbon may detach from the active material which is expanding and shrinking during charge-discharge cycles, so that more and more volume elements of the composite become inactive.

Plitz et al. presented a method for synthesising Carbon-Metal Fluoride Nanocomposites (CMFNCs) starting from insulative carbon fluoride (CF) as oxidizing agent and $FeF_2$, $NiF_2$, or $CoF_2$ precursors (I. Plitz, F. Badway, J. Al-Sharab, A. DuPasquier, F. Cosandey, G. G. Amatucci "Structure and Electrochemistry of Carbon-Metal Fluoride Nanocomposites Fabricated by Solid-State Redox Conversion Reaction" (2005) Journal of the Electrochemical Society, 152(2) 307-315). Unfortunately, ball milling destroys any complex microstructure and the small nanocrystals can agglomerate much more easily. This state of the art system contains relatively large $FeF_3$ nanoparticles in a range of about 20 nm. Moreover, the ball milling of active material with conductive carbon leads to nanocomposite structures where carbon flakes are weakly attached to the nanoparticles or structures where the particles are sitting loosely on top of the carbon/graphene surface. In all of these materials degradation occurs during charging and draining because the interface is not stable enough to deal with the associated volume expansion and shrinkage of the active electrode material, in particular when conversion materials are used.

A further disadvantage of the state of the art is the lack of an economic one-step synthesis which is easy to perform. The cited state of the art does not disclose iron nanoparticles or nanocomposites clamped into a highly conducting graphitic matrix.

SUMMARY OF THE INVENTION

To overcome the disadvantages of the state of the art, it is an objective of the present invention to provide a fabrication method which leads to a nanoscale dispersion and a stable anchoring of iron compounds, in particular $FeF_2$ and $Fe_2O_3$ on or in a graphitic matrix. The nanomaterial is obtained by a reactive deposition of a volatile iron compound with chemically modified graphite which initially acts as an $F^-$ or $O^{2-}$ donor and transforms from a non-conducting graphite derivative into electrically conducting graphite during the process. The synthesis proceeds in one step and leaves no solid or liquid by-products.

It is another objective of the present invention to provide a nanocomposite containing intercalated $FeF_2$— or $Fe_2O_3$— nanoparticles in a graphitic carbon matrix.

It is a further objective of the present invention to provide an electrode material for its use in a battery cell. This battery material should be based on a nanocomposite containing intercalated $FeF_2$— or $Fe_2O_3$— nanoparticles in a graphitic carbon matrix. The material should overcome the problems of the poor electric conductivity due to a closer interface between the active iron material and the graphite conductor, and poor cycling stability resulting from significant volume expansion during the redox reaction.

The invention provides a method to synthesize a nanocomposite containing intercalated $FeF_2$— or $Fe_2O_3$— nanoparticles in a graphitic carbon matrix by reaction of a volatile iron compound with a graphite fluoride $(CF_x)$ or a graphite oxide $(CO_x)$ in a hermetically closed vessel at a temperature from 100° C. to 400° C. Preferably, the reaction time is from 2 to 24 hours.

During this bottom-up synthesis (pyrolysis), the volatile iron compound is dispersed in the graphite derivative where it reacts with the fluorine or oxygen atoms initially bound to the graphite and crystallises as nanoscale iron compound between the graphite sheets without defoliating them completely. The formerly insulating graphite fluoride or -oxide transforms into a highly conductive graphitic matrix by this reaction.

Due to the extraordinary process of performing the reaction inside the graphite derivative, the product $FeF_2$— nanoparticles are mechanically clamped inside the formed graphitic structure providing an excellent electrical contact between the constituents.

Hence, the structure of the nanocomposite is made up of a graphitic carbon matrix which encapsulates the $FeF_2$ nanoparticles. This encapsulation leads to a waved structure of the graphite sheets in between which the nanoparticles are embedded. In the case of $Fe_2O_3$, particles are also found at the outer surface which is not the case with $FeF_2$.

In a preferred embodiment, the reaction is performed under inert gas atmosphere. Inert gas such as argon may prevent any side reactions leading to a product of a lower purity or a poorer yield.

In another preferred embodiment, the volatile iron compound is $Fe(CO)_5$. By using this educt, the only side product is CO which leaks upon opening of the reaction vessel after the reaction and the crude product of this reaction can be used as such without further purification.

In yet another preferred embodiment the graphitic educt, graphite fluoride ($CF_x$) or the graphite oxide ($CO_x$), are milled at ambient or cryogenic temperatures prior to the pyrolysis reaction. One example of milling is ball milling.

The crystallite size of formed iron fluoride nanoparticles lies in a narrow range between 8 and 12 nm, proved with TEM and XRD measurements. The nanoparticles are clamped or embedded in or on the surface of the graphitic carbon matrix, such that an agglomeration of the particles is prevented and electrical contact of the insulating active material is provided.

The present invention further provides a nanocomposite containing intercalated $FeF_2$— or $Fe_2O_3$— nanoparticles in a graphitic carbon matrix synthesised by a method described in this invention.

The present invention provides also a nanocomposite containing intercalated $FeF_2$— nanoparticles in a graphitic carbon matrix, wherein the nanoparticles have a diameter from 8 nm to 12 nm. In a preferred embodiment, the nanocomposite contains 75 to 85 wt % of iron fluoride particles and 15 to 25 wt % of carbon.

Due to its particular graphitic nature, the composite exhibits a considerably lower resistivity than other materials described in the state of the art. This nanocomposite reveals a resistivity of 120-150 Ω*cm at a density of 2.5-3.5 g/cm³. In the cited literature (Plitz et al. see above), pellets of a composite consisting of iron fluoride and carbon produced by ball milling showed a resistivity of 1500 Ω*cm with a specific weight of the pellet of 0.5 cm³/g.

One advantage of the nanocomposite with the embedding graphitic carbon matrix is that an agglomeration of the particles is impeded or prevented. The iron salt crystallites remain well dispersed in the matrix during cycling.

Another advantage of the composite is the strong binding forces between the particles and the graphitic surface due to the widening and bending of the graphite sheets. The binding forces of the graphitic structure lead to an intimate contact of the particles to the graphite. As a consequence, the particles which are electrically insulating by nature are embedded in an electrically conducting environment (graphite) with electronic conductors and thus become electrochemically active.

A further advantage of the nanocomposites according to the present invention is the large amount of the active iron compound inside the graphitic matrix. There is no need to purify the nanocomposites or add additional carbon after the pyrolysis when using as electrochemically active material in batteries. About 80 wt % of the obtained crude composite is active material, and, when used in an electrochemical storage cell such as a lithium battery, the active material yields to an amount of 72 wt % active material on the electrode upon adding 10 wt % of binder.

Hence, the invention also provides electrochemically active material containing a nanocomposite with intercalated $FeF_2$— or $Fe_2O_3$— nanoparticles in a graphitic carbon matrix as described in the invention. In a preferred embodiment, this electrochemically active material is for use in an electrochemical storage cell.

BRIEF DESCRIPTION OF THE DRAWINGS

The following figures and examples are presented to provide a better understanding of the description of procedures and conceptual aspects of the invention.

DETAILED DESCRIPTION OF THE INVENTION

Example 1

Synthesis of Graphite-$FeF_2$ Nanocomposite

For the synthesis, graphite fluoride ($CF_x$) is used as a potential source of graphitic carbon and fluorine. Further, it has a high thermodynamic reduction potential vs. lithium (4.2 V). Iron pentacarbonyl $Fe(CO)_5$ is employed as a liquid source of iron metal which performs a redox reaction with graphite fluoride and form a graphitic carbon wrapped $FeF_2$ nanocomposite with no solid or liquid by-products, according to the following equation:

$$CF_{1.1} + 0.55\ Fe(CO)_5 \rightarrow C + 0.55\ FeF_2 + CO\ (gas)$$

Synthesis of nanocomposites was performed in stainless steel reactors. In a typical synthesis 0.56 ml of $Fe(CO)_5$ was added to 0.25 g of $CF_{1.1}$ powder (grey white) in the stainless steel reactor and closed with VCR fittings inside an argon filled glove box. The reactor was placed inside a tube furnace and the temperature was raised from room temperature to 250° C. with a heating rate of 5° C./min. The reaction was carried out at this temperature for 2-24 hours; then the reactor was allowed to cool down naturally. The pressure developed due to the formation of gaseous side product was carefully released, the reactor was opened under argon atmosphere and the resulting black powder was collected.

Example 2

Synthesis of Graphite-$Fe_2O_3$ Nanocomposite

In a first step, graphite oxide was prepared according to a protocol published by Hummer and Offeman (W. S. Hummers, R. E. Offeman "Preparation of Graphitic Oxide" (1958) J. Am. Chem. Soc., 80 (6), 1339-1339) by oxidising graphite in a mixture of $KMnO_4$ and $NaNO_3$ in $H_2SO_4$. The second step is performed according to example 1. Graphite oxide and iron pentacarbonyl were pyrolysed under argon atmosphere during 24 h at a temperature of 150° C.

Example 3

Characterisation of Graphite-$FeF_2$ Nanocomposite

Powder X-ray diffraction (PXRD) patterns were recorded in the 2θ range 10-70° n. TEM (Transmission Electron Microscopy) samples were prepared on holey carbon grid in dry mode. Nitrogen physisorption measurements were conducted at 77 K. Prior to measurements the samples were degassed at 150° C. for 12 h in a vacuum. The specific surface area was determined according to the BET (Brunauer, Emmet, Teller) theory. Fourier transform infrared (FT-IR) spectra recorded using KBr as medium.

Figure 1:
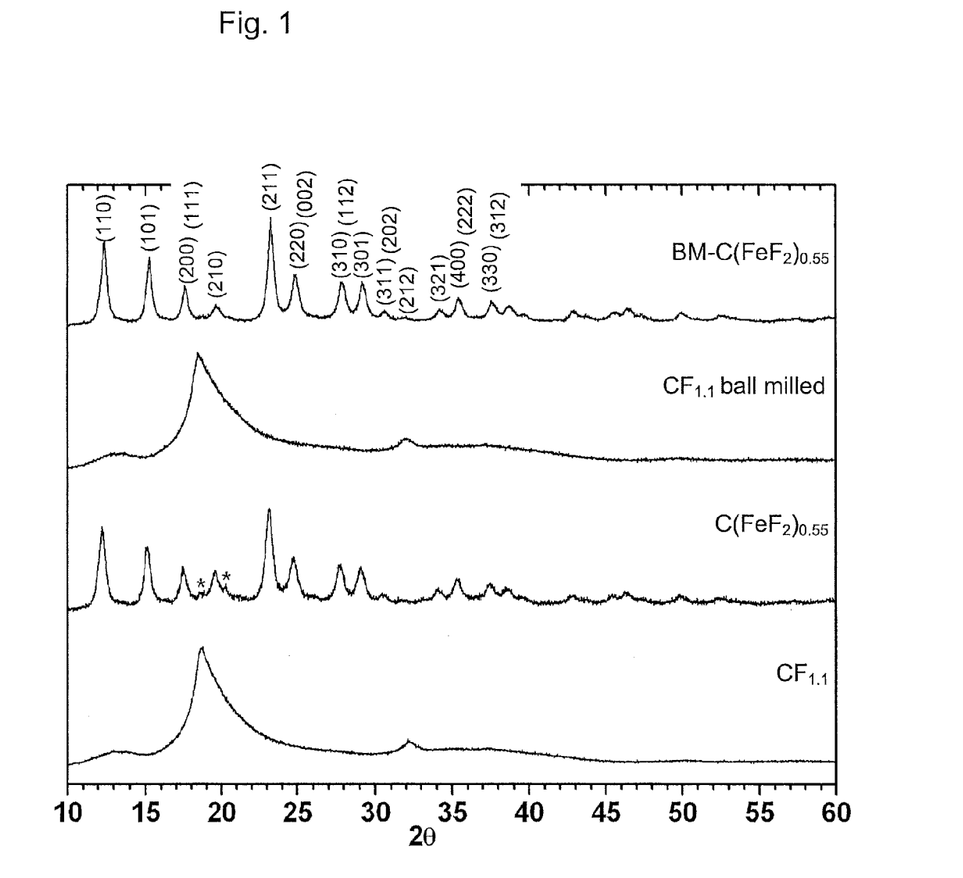
FIG. 1 show diagrams of powder XRD patterns of Pristine $CF_{1.1}$, $C(FeF_2)_{0.55}$, ball milled $CF_{1.1}$ and BM-$C(FeF_2)_{0.55}$.

FIG. 1 Shows the powder XRD patterns of pristine $CF_{1.1}$, $C(FeF_2)_{0.55}$, $CF_{1.1}$ ball milled for 2 h and BM-$C(FeF_2)_{0.55}$ samples. The $CF_{1.1}$ is phase pure and no unreacted graphite is seen in the XRD. After reaction with $Fe(CO)_5$, graphite fluoride peaks vanished and formation of single-phase $FeF_2$ is evident from XRD pattern. The ball milled graphite fluoride shows similar XRD pattern to that of pristine graphite fluoride, no amorphisation is observed due to ball milling. The corresponding sample after the reaction with $Fe(CO)_5$ shows only the peaks corresponds to the formation of $FeF_2$. The average crystallite size of $FeF_2$ calculated from Scherrer equation is 12.4 and 14.0 nm for $C(FeF_2)_{0.55}$ and BM-$C(FeF_2)_{0.55}$ respectively. The lattice parameters of the rutile structure of $FeF_2$ are a=4.7084 Å, c=3.3086 Å and a=4.7068 Å c=3.3071 Å for $C(FeF_2)_{0.55}$ and BM-$C(FeF_2)_{0.55}$ samples respectively.

Figure 2:
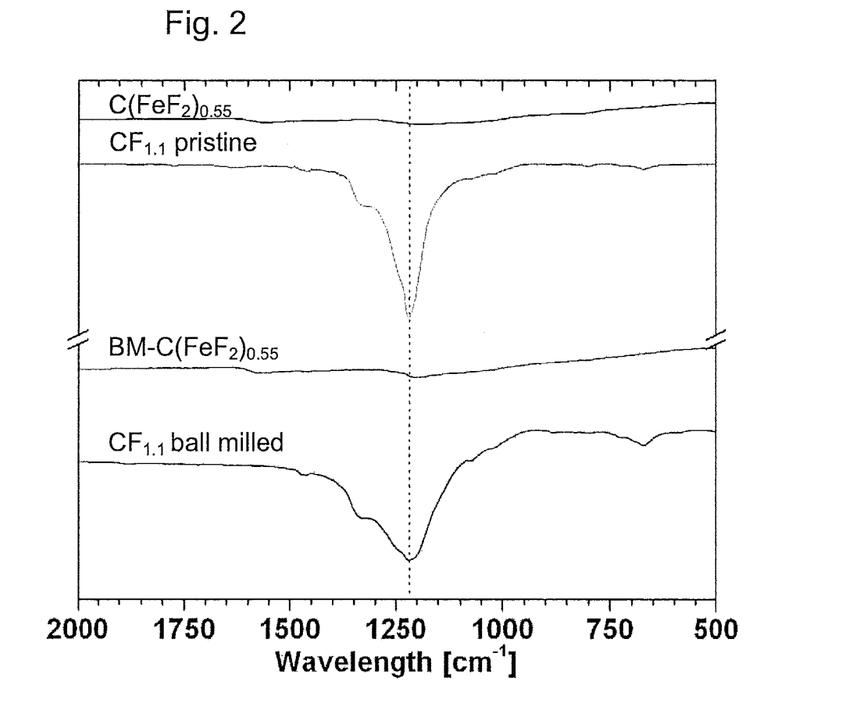
FIG. 2 show diagrams of FT-IR spectra of $CF_{1.1}$ pristine, ball milled $CF_{1.1}$, $C(FeF_2)_{0.55}$ and BM-$C(FeF_2)_{0.55}$

As any unreacted graphite fluoride would be difficult to identify by XRD analysis Fourier Transform Infrared (FT-IR) spectroscopy was used, which is sensitive to the presence of C—F bonds and the nature of C—F bond present. FIG. 2 shows the IR spectra of pristine $CF_{1.1}$, $C(FeF_2)_{0.55}$, ball milled $CF_{1.1}$ and BM-$C(FeF_2)_{0.55}$. The band at 1216 $cm^{-1}$ corresponds to the covalent C—F bond which is present to smaller extent even after reaction with $Fe(CO)_5$.

Figure 3A:
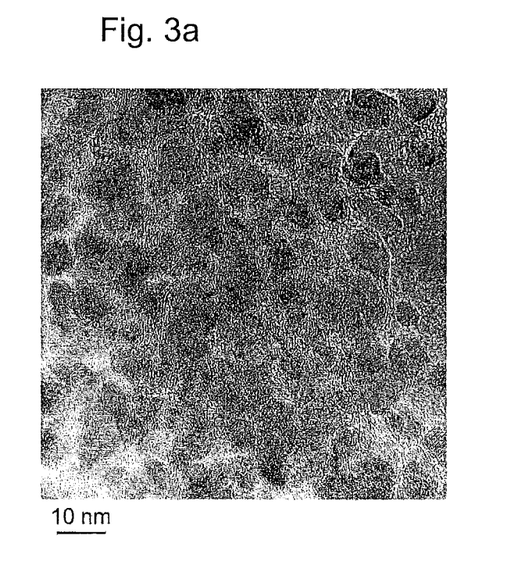
FIG. 3a is a TEM image and FIG. 3b is a schematic structure of $C(FeF_2)_{0.55}$
Figure 3B:
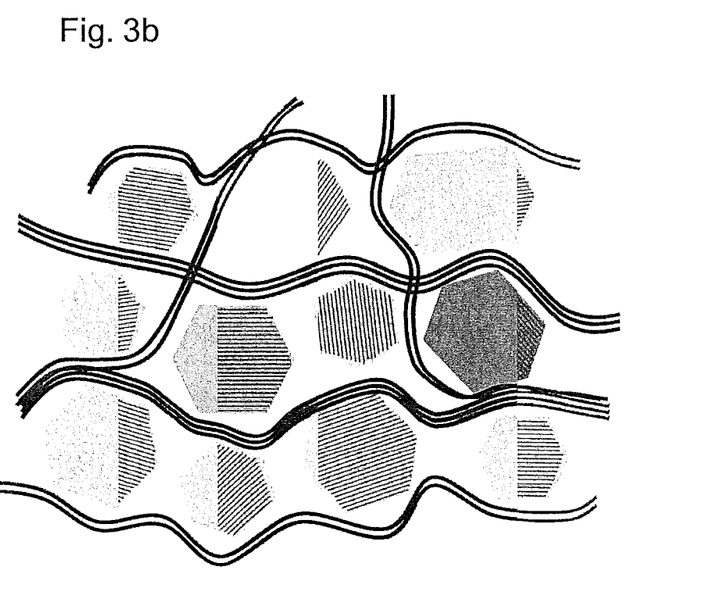

FIG. 3 (a) shows the TEM image of the nanocomposite containing intercalated $FeF_2$— nanoparticles in a graphitic carbon matrix according to the invention. After reaction with $Fe(CO)_5$, the graphitic compound still exhibits flake like morphology with layered structure, nevertheless the layers unfoliated and densely occupied with $FeF_2$ nanoparticles. These microstructural changes are clearly visible in FIG. 3 (a). Evidently, the TEM image shows that, $FeF_2$ crystallites are wrapped by or intercalated in few layered graphene sheets. The average crystallite size of $FeF_2$ calculated from TEM is 8-12 nm for $C(FeF_2)_{0.55}$ and BM-$C(FeF_2)_{0.55}$ respectively, in corroboration with the value calculated from the Scherrer formula. The selected area diffraction pattern exhibits a good crystallinity of the $FeF_2$ particles. FIG. 3 (b) is a schematic drawing of the same material. These pictures display the structure of entire graphene sheets with the intercalated $FeF_2$ nanoparticles. The nanoparticles are homogenous in size and distribution over the whole graphitic matrix. Unlike all other known materials the present nanocomposite described in this embodiment is characterized by an anchoring of active materials nanoparticles inside a graphitic host structure leading to a clamping of the particles in the electronically conducting matrix by strong mechanical forces which are due to long range elastic properties of bended graphite structures.

SEM images of ball milled $CF_{1.1}$ show a more irregular morphology and no visible layered structure, see Supporting Information, FIG. S2 (b). Although this morphology was retained after the reaction with $Fe(CO)_5$, HRTEM reveals similar type of nanostructure as observed in case of $C(FeF_2)_{0.55}$. From SEM and HRTEM, it is clear that even though the external morphology may be different, both $C(FeF_2)_{0.55}$ and BM-$C(FeF_2)_{0.55}$ have a similar nanostructure.

Example 4

Characterisation of Graphite-$Fe_2O_3$ Nanocomposite

Figure 4:
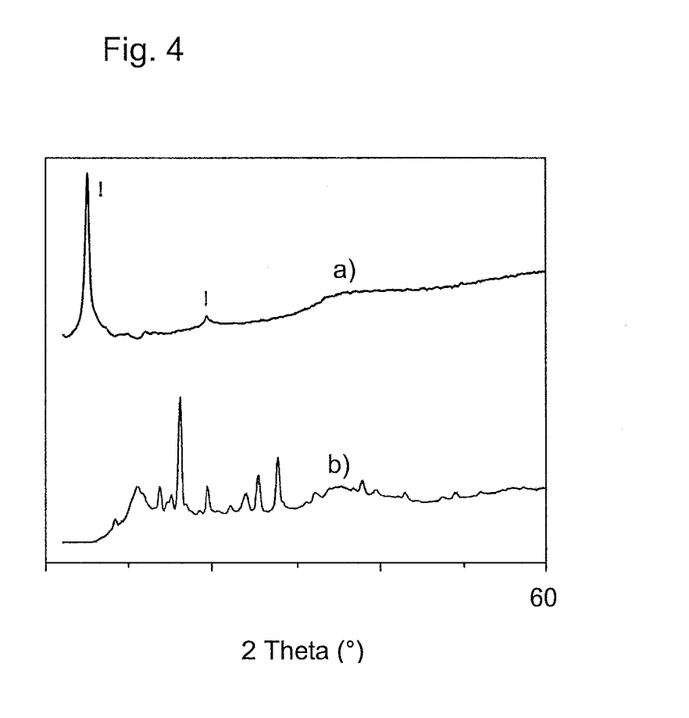
FIG. 4 is show powder XRD patterns of graphite oxide and graphite $Fe_2O_3$ nanocomposite.

FIG. 4 shows the powder XRD patterns of graphite oxide (a) and the graphite/$Fe_2O_3$ product (b). Graphite oxide displays two characteristic peaks which completely vanish upon pyrolysis of the graphite oxide with iron carbonyl. The peaks represented in spectrum (b) correspond to the crystal structure of $Fe_2O_3$.

Example 5

Electrochemical Studies with Graphite-$FeF_2$ Nanocomposites

Two types of samples of graphite-$FeF_2$ nanocomposites were used for the electrochemical study; one sample was prepared by reacting pristine $CF_{1.1}$ with $Fe(CO)_5$ for 24 h, here labeled as $C(FeF_2)_{0.55}$; second sample is prepared by reacting pre-milled (see supporting information) $CF_{1.1}$ with $Fe(CO)_5$ for 24 h, hereafter labeled as BM-$C(FeF_2)_{0.55}$.

Electrochemical studies were performed in stainless steel cells. The electrode fabrication and electrochemical cells were assembled in an argon filled glove box. Electrodes were fabricated by mixing as synthesized material and poly-vinylidene fluoride (PVDF) in the weight ratios 90:10. A slurry containing the above mixture was prepared by using N-methyl-2-pyrrolidinone and was spread on a stainless steel foil (area: 1.13 $cm^2$) and dried on hot plate at 160° C. for 12 h. The final weight percentage of the active material in the electrode was 70%. Each electrode contained 4.0-6.0 mg of the active material. Lithium foil was used as the negative electrode, and a borosilicate glass fiber sheet (separator) saturated with 1 M $LiPF_6$ in 1:1 ethylene carbonate (EC)/dimethyl carbonate (DMC) was used as electrolyte. The cells were placed in an incubator (Binder) to maintain a constant temperature of 25° C. or 40° C. The electrochemical studies were carried out using Arbin battery cycling unit.

a) Composite Synthesized from as-Received $CF_{1.1}$

This nanocomposite $FeF_2$ in a graphitic matrix reveals a resistivity of 177 Ω*cm when pelletised with an applied pressure of 3 t/$cm^2$ to a density of 2.3 g/$cm^3$ and this resistivity decreases to 128 Ω*cm upon pelletising with an applied pressure of 10 t/$cm^2$ to a density of 2.56 g/$cm^3$.

Figure 5:
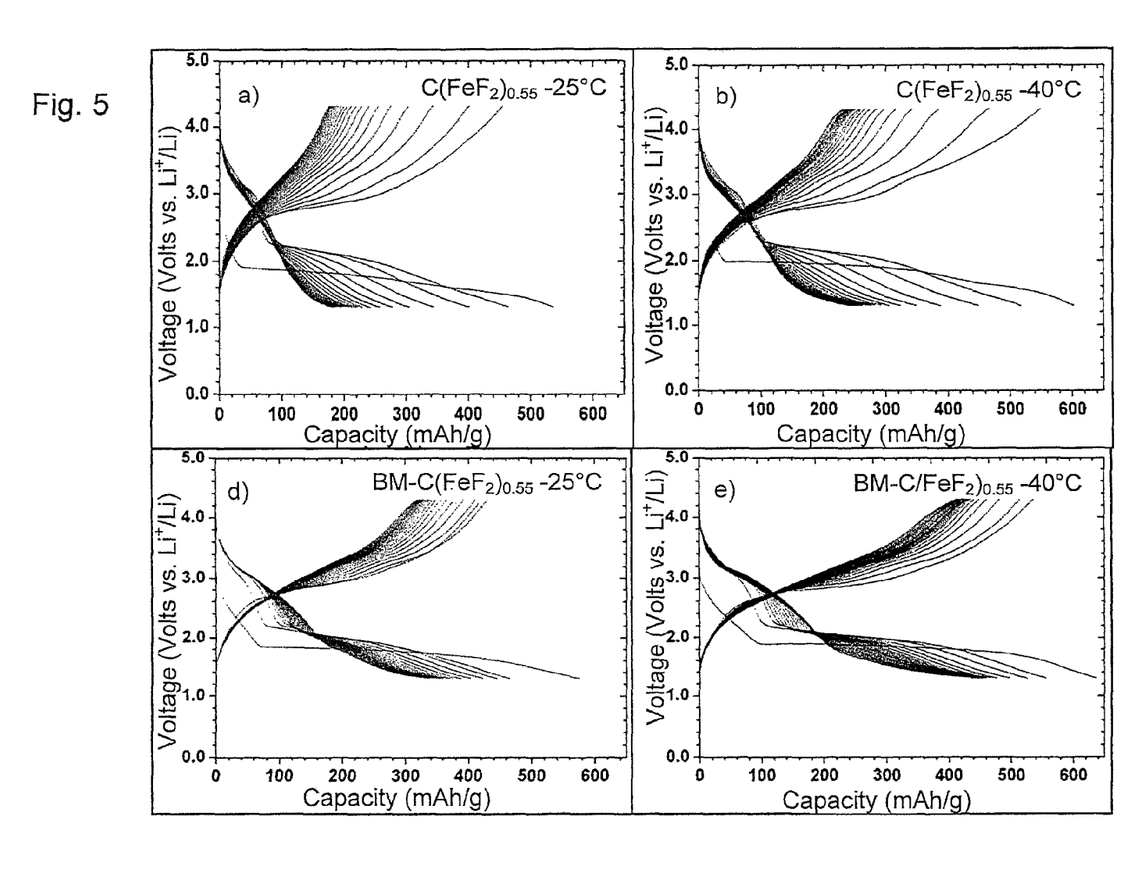
FIG. 5 shows electrochemical discharge/charge curves of $C(FeF_2)_{0.55}$ (a) at 25° C. (b) at 40° C. and (c) corresponding differential capacity plot for the first three cycles; discharge/charge curves of BM-$C(FeF_2)_{0.55}$ (d) at 25° C. (e) at 40° C. and (f) corresponding differential capacity plot for first three cycles.

FIG. 5 (a) shows the electrochemical discharge/charge curves of $C(FeF_2)_{0.55}$ at 25° C. The first discharge capacity was 538 mAh/g, which is 94% of the theoretical specific capacity of 571 mAh/g. The first charge capacity was 456 mAh/g. The irreversible capacity loss (ICL) in the first cycle was 82 mAh/g. Upon cycling the capacity faded rapidly and reached a value of 222 mAh/g after 10 cycles, after which a slow decay was noticed in capacity. The first discharge process can be divided into three regions. In the first region, voltage decays monotonically from open circuit voltage (OCV) to 1.9 V, corresponding to a capacity of 35 mAh/g. In the second region, a voltage plateau is observed at an average voltage of 1.85 V followed by small plateau at 1.54 V. Generally, $FeF_2$ reacts at a single potential plateau, the voltage of which depends on particle size. However, in the present case an additional small plateau was observed at 1.54V, which we attribute to the reaction of kinetically hindered $FeF_2$ regions, which might have formed due to the bigger particle size of pristine $CF_{1.1}$ used for the reaction. This could be also reason for the observed less capacity of 538 mAh/g in the first discharge, compared to the theoretical specific capacity of 571 mAh/g.

In order to see potential temperature effects on the electrochemical performance, discharge/charge measurements were also performed at 40° C. (FIG. 5 (b)). At this temperature, the first discharge capacity increased to 603 mAh/g. The ICL was reduced to 54 mAh/g. Further, effect of temperature on discharge and charge voltage can be seen in differential capacity plots (FIG. 5 (c)). The average discharge potential increased from 1.85 V to 1.96 V when the discharge temperature increased from 25° C. to 40° C. Interestingly, there is no further effect of temperature on the voltage of subsequent charge/discharge cycles.

b) Composite Synthesized from Ball Milled $CF_{1.1}$

Ball milling of $CF_{1.1}$ is done using tungsten carbide vial and balls. The sample was milled for 2 h at 300 rpm with ball to powder ratio of 24:1. The BET surface area increased from 213 $m^2$ to 266 $m^2$ during ball milling. The differential pore volumina show that the ball milled sample contained fewer micropores but more mesopores which led to an increase of the total pore volume from 0.1 to 0.14 $cm^3/g$.

FIG. 5 (d) shows the discharge/charge curves of BM-$(FeF_2)_{0.55}$ obtained at 25° C. The first discharge capacity was 576 mAh/g, which is similar to the theoretical specific capacity. The first charge capacity is 422 mAh/g. The ICL (irreversible capacity loss) in the first cycle is 154 mAh/g, which is almost doubled compared to that of $C(FeF_2)_{0.55}$ sample discharge at the same temperature. However, the capacity fade was rather slow and a capacity of 355 mAh/g was reached after 10 cycles. In case of cells discharged at 40° C. (FIG. 5 (e)), the first discharge capacity is 637 mAh/g and first charge capacity was 537 mAh/g, with an ICL of 100 mAh/g. Once again the ICL was almost twice the value of that of the $C(FeF_2)_{0.55}$ sample discharged at 40° C.

A possible reason for this unexpected ICL may be as follows. The first discharge profile of BM-$C(FeF_2)_{0.55}$ can be divided into two regions. In the first region the voltage drops in a sloped manner until it reaches a value of 1.85 V, with a corresponding capacity of 72 mAh/g. The second region is a plateau at an average voltage of 1.8 V (FIG. 5 (f)). The cells discharged at 40° C. showed rather similar profiles as that of the sample discharged at 25° C., nevertheless the capacity corresponding to the first region was 106 mAh/g.

FTIR measurements showed that the capacity observed in the first region both in case of $C(FeF_2)_{0.55}$ and BM-$C(FeF_2)_{0.55}$ was not due to the reaction of $FeF_2$, but due to the reaction of residual $CF_x$ present in the sample. The measurements indicate an unreacted $CF_x$ fraction left in both cases. It is known that $CF_x$ reacts with lithium electrochemically and irreversibly in the 3.0–2.0 V region. Thus, we attribute the extra capacity observed in case of samples discharged at 40° C. to the reaction of $CF_x$ left in the sample and this reaction is more prominent in BM-$(FeF_2)_{0.55}$ sample due to its high surface area. $CF_x$ irreversibly reacts with lithium and forms C+LiF. From the charge/discharge curves and the differential capacity plot it is also evident that a part of $FeF_2$ is converted to $FeF_3$ in the first charge, which could be the reason for the observed reaction around 3.0V during second and subsequent cycling.

Figure 6:
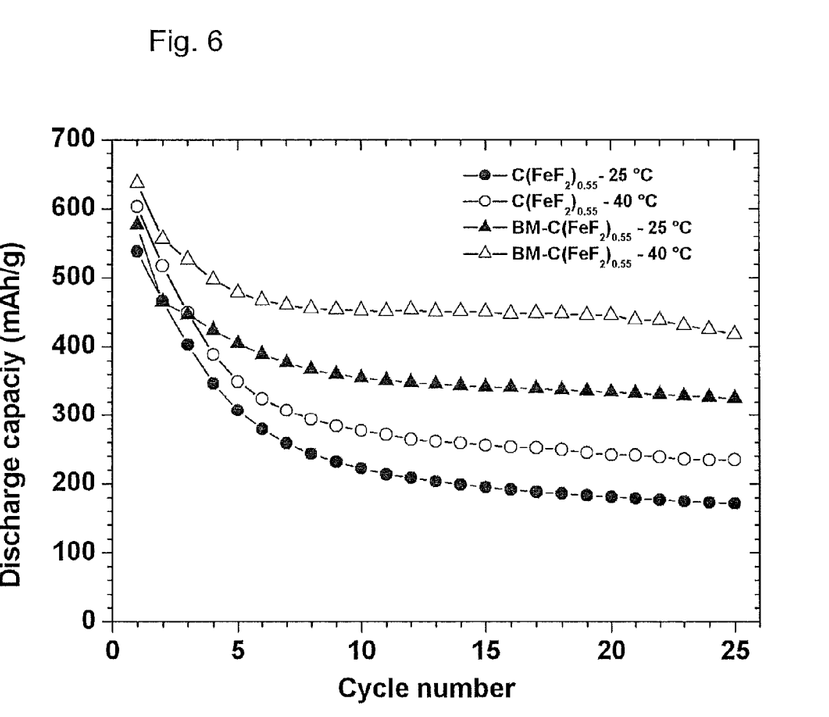
FIG. 6 shows electrochemical cycling of $C(FeF_2)_{0.55}$ and BM-$C(FeF_2)_{0.55}$ at 25° C. and 40° C.

FIG. 6 shows the cycling behavior of $C(FeF_2)_{0.55}$ and BM-$C(FeF_2)_{0.55}$ at 25° C. and 40° C. The capacity faded rapidly in case of $C(FeF_2)_{0.55}$ and reached a value of 171 mAh/g after 25 cycles at 25° C., whereas a capacity of 235 mAh/g was achieved when cycled at 40° C. In case of BM-$C(FeF_2)_{0.55}$ the capacity fade was rather slow and reached value of 325 mAh/g at 25° C. and 418 mAh/g at 40° C.

Example 6

Electrochemical Studies with Graphite-$Fe_2O_3$ Nanocomposites

Figure 7:
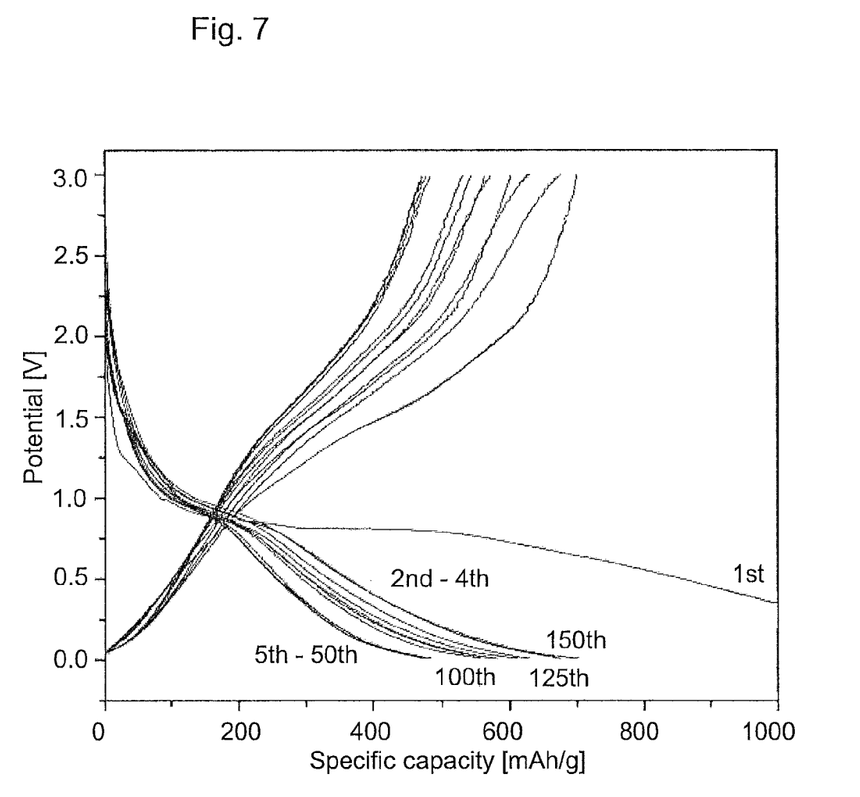
FIG. 7 shows electrochemical discharge/charge curves of $C(Fe_2O_3)$.

Electrochemical studies with graphite $Fe_2O_3$ material was performed in the same way as described in example 5. FIG. 7 shows discharge/charge curves obtained at a current density of 100 mA/g. After the first cycles the specific capacity fades to 500 mAh/g. With increasing number of cycles the specific capacity increases to about 700 mAh/g.

The invention claimed is:
1. A method to synthesize a nanocomposite, comprising:
   (a) reacting a volatile iron compound comprising $Fe(CO)_5$ with a graphite fluoride ($CF_x$) in a hermetically closed vessel at a temperature of 100° C. to 400° C. to produce intercalated $FeF_2$ nanoparticles embedded in a graphitic carbon matrix, or
   (b) reacting a volatile iron compound comprising $Fe(CO)_5$ with a graphite oxide ($CO_x$) in a hermetically closed vessel at a temperature of 100° C. to 400° C. to produce intercalated $Fe_2O_3$ nanoparticles embedded in a graphitic carbon matrix.
2. The method according to claim 1, further including closing the vessel in an inert gas atmosphere prior to the reacting step.
3. The method according to claim 1, wherein the reacting step is performed from 6 to 24 hours.
4. The method according to claim 1, further including milling, respectively, the graphite fluoride ($CF_x$) or the graphite oxide ($CO_x$) before the reacting step.

* * * * *